(12) United States Patent
Krause

(10) Patent No.: US 11,585,099 B2
(45) Date of Patent: Feb. 21, 2023

(54) INTERNAL COMPOSITION OF A BRACKET MEMBER FOR INSULATION

(71) Applicant: Advanced Architectural Products, LLC, Allegan, MI (US)

(72) Inventor: G. Matt Krause, Allegan, MI (US)

(73) Assignee: Advanced Architectural Products, LLC, Allegan, MI (US)

( * ) Notice: Subject to any disclaimer, the term of this patent is extended or adjusted under 35 U.S.C. 154(b) by 0 days.

(21) Appl. No.: 17/380,970

(22) Filed: Jul. 20, 2021

(65) Prior Publication Data

US 2021/0348394 A1  Nov. 11, 2021

Related U.S. Application Data

(63) Continuation of application No. 16/879,754, filed on May 20, 2020, now Pat. No. 11,066,832, which is a continuation of application No. PCT/US2018/061941, filed on Nov. 20, 2018.

(51) Int. Cl.
| | |
|---|---|
| *E04F 13/08* | (2006.01) |
| *E04B 1/38* | (2006.01) |
| *E04B 1/76* | (2006.01) |
| *E04B 1/94* | (2006.01) |
| *E04B 1/41* | (2006.01) |
| *E04B 2/74* | (2006.01) |
| *E04F 13/22* | (2006.01) |
| *F16B 2/06* | (2006.01) |
| *C03C 13/06* | (2006.01) |

(52) U.S. Cl.
CPC ............ *E04F 13/0817* (2013.01); *E04B 1/40* (2013.01); *E04B 1/7629* (2013.01); *E04B 1/7654* (2013.01); *E04B 1/942* (2013.01); *E04B 2/7412* (2013.01); *E04F 13/0803* (2013.01); *E04F 13/22* (2013.01); *F16B 2/06* (2013.01); *C03C 13/06* (2013.01); *E04B 2001/405* (2013.01); *E04B 2001/7679* (2013.01)

(58) Field of Classification Search
CPC ...... E04B 1/7654; E04B 1/7629; E04B 1/942; E04B 1/40; E04B 2/7412; E04B 2001/7679; E04B 2001/405; E04F 13/0803; E04F 13/22; E04F 13/0817; F16B 2/06; C03C 13/06
See application file for complete search history.

(56) References Cited

U.S. PATENT DOCUMENTS

| | | | | |
|---|---|---|---|---|
| 4,361,613 A | * | 11/1982 | Bogner | E04B 1/942 156/212 |
| 6,266,936 B1 | * | 7/2001 | Gelin | E04B 9/001 52/712 |
| 8,826,620 B2 | * | 9/2014 | Krause | E04F 13/0803 52/489.1 |
| 10,202,775 B2 | * | 2/2019 | Krause | E04F 13/0828 |
| 10,443,229 B2 | * | 10/2019 | Krause | E04B 1/40 |
| 10,619,354 B1 | * | 4/2020 | Simonsen | E04F 13/0869 |

(Continued)

*Primary Examiner* — Jessie T Fonseca
(74) *Attorney, Agent, or Firm* — The Watson IP Group, PLC; Jovan N. Jovanovic

(57) ABSTRACT

A wall structure having an inner wall, a bracket member, a non-combustible board, and an outer cladding coupled together and retaining insulation between the inner wall and the outer cladding. The non-combustible board is positioned between the bracket member and the outer cladding.

13 Claims, 11 Drawing Sheets

(56) References Cited

U.S. PATENT DOCUMENTS

| | | | | |
|---|---|---|---|---|
| 2010/0307094 | A1* | 12/2010 | Spyrou | E04F 13/142 52/489.1 |
| 2012/0167505 | A1* | 7/2012 | Krause | E04F 13/12 52/302.1 |
| 2014/0250811 | A1* | 9/2014 | Krause | E04C 2/205 52/309.4 |
| 2015/0121787 | A1* | 5/2015 | Krause | E04F 13/12 52/302.1 |
| 2015/0152678 | A1* | 6/2015 | Krause | E04B 1/665 52/62 |
| 2015/0308098 | A1* | 10/2015 | Tessadori | E04B 1/40 52/698 |
| 2016/0053494 | A1* | 2/2016 | White | F25D 23/085 52/698 |
| 2016/0186427 | A1* | 6/2016 | Castelle | E04B 1/803 52/510 |
| 2016/0194875 | A1* | 7/2016 | Krause | E04B 1/7629 52/309.4 |
| 2016/0208479 | A1* | 7/2016 | Krause | E04F 13/0803 |
| 2017/0198471 | A1* | 7/2017 | Krause | E04F 13/0817 |
| 2017/0342723 | A1* | 11/2017 | Krause | E04B 1/40 |
| 2017/0342724 | A1* | 11/2017 | Farahmandpour | E04F 13/0853 |
| 2017/0356181 | A1* | 12/2017 | Krause | E04B 1/40 |
| 2017/0370096 | A1* | 12/2017 | Ochi | E04F 13/147 |
| 2018/0010341 | A1* | 1/2018 | Krause | E04F 13/16 |
| 2019/0153733 | A1* | 5/2019 | Krause | E04B 1/7654 |
| 2019/0177981 | A1* | 6/2019 | Krause | E04B 1/61 |

* cited by examiner

INTERNAL COMPOSITION OF A BRACKET MEMBER FOR INSULATION

CROSS-REFERENCE TO RELATED APPLICATION

This present application is a continuation of U.S. patent application Ser. No. 16/879,754 filed on May 20, 2020, entitled "INTERNAL COMPOSITION OF A BRACKET MEMBER FOR INSULATION", now U.S. Pat. No. 11,066,832, which is a continuation of PCT Patent Application Serial No. PCT/US2018/061941 filed on Nov. 20, 2018, entitled "INTERNAL COMPOSITION OF A BRACKET MEMBER FOR INSULATION", which claims priority from U.S. patent application Ser. No. 15/817,494, filed Nov. 20, 2017, entitled "Internal COMPOSITION OF A BRACKET MEMBER FOR INSULATION", now abandoned, the entire specification of each of which is hereby incorporated by reference in its entirety.

BACKGROUND OF THE DISCLOSURE

1. Field of the Disclosure

The disclosure relates in general to building products, and, more particularly, to a bracket assembly and the internal composition thereof, wherein the bracket assembly is utilized in an insulation system for use in buildings.

2. Background Art

In the past, in order to provide a highly thermally efficient (metal) wall or (metal) roof assembly for a building enclosure, it has been necessary for metal materials, typically an exterior and interior metal skin, to be bonded to either side of an insulated panel core inside a factory thereby creating a foam panel. These metal skins are typically profiled and have offsets in them to prevent the exterior metal skin from contacting the interior metal skin. This is done in an effort to prevent metal to metal contact thereby reducing thermal conductivity from the outside of the building. Heat travels in the path of least resistance such that heat can invade a system and affect an interior atmosphere through relatively finite pathways such as fasteners and the like that have metal to metal contact with exterior conditions. Similarly, exterior exposure to cold temperatures can allow for infusion of cold temperatures into a wall construction along highly thermally conductive components.

Most applications of metal roof and wall assemblies retain at least some form of metal to metal contact through metal anchors, fasteners, or sill, transition, and window trim. Products of this type are subject to shorter warranties and life cycles due to the fact that the product is glued or otherwise bonded and is subject to damage and shortened life spans from thermal cycling which causes varying rates of contraction and expansion of the different materials and therefore wears significantly on any given system. Furthermore, these systems often require dissimilar materials to be in contact with each other which can lead to reactions such as oxidation which can corrode these materials over time. A metal wall, roof or deck system that creates a thermal break in the heat conductivity path thereby effectively eliminating or greatly reducing thermal bridging from exterior conditions to interior conditions that keeps like materials separate is desired.

Also, problematically, many such configurations lack the necessary fire resistance, which has become evident from recent building fires. In recent fires, such as the recent high rise fire in London, England, the flammable cladding accelerated the spread of fire.

SUMMARY OF THE DISCLOSURE

The disclosure is directed to a wall structure comprising an inner wall, an outer cladding, a plurality of bracket members and a non-combustible board. The inner wall has an outer surface. The outer cladding has an inner surface. The bracket assemblies (at least one) comprises an elongated bracket member and end support members. The elongated bracket member has a cross-sectional configuration defining a body wall having an inner end and an outer end. A first end wall extending from the inner end of the body wall and a second end wall extending from the outer end. The first end wall support member is attached to the first end wall and a second end wall support member is attached the second end wall. The bracket member further comprises a plurality of fibers within a resin matrix. The non-combustible board having an outer surface and an inner surface.

The bracket assembly is positioned so that an outer surface of the first end wall overlies the outer surface of the inner wall, and an outer surface of the second end wall overlies the inner surface of the non-combustible board. The outer surface of the non-combustible board overlies the inner surface of the outer cladding, so as to sandwich the non-combustible board between the bracket assembly and the outer cladding. A first fastener extends through the first end wall support member the bracket member and into the inner wall. The first fastener extends through the at least one fiber fabric. A second fastener extends through the outer cladding, through the bracket member and through the second end wall support member. The second fastener extends through the at least one fiber fabric embedded within the second end wall.

In some configurations, the non-combustible board comprises a strip that has a width that is greater than a width of the second end wall so as to extend over a footprint of the second end wall.

In some configurations, the non-combustible board comprises one of a strip that has a width that is greater than a width of the second end wall so as to extend over a footprint of the second end wall and a strip that spans between a plurality of the plurality of bracket assemblies.

In some configurations, an insulation is positioned between the inner wall and the outer cladding and extending between a plurality of the plurality of bracket assemblies.

In some configurations, the insulation comprises a mineral wool.

In some configurations, a clamping member is positioned between the elongated bracket member and non-combustible board.

In some configurations, the clamping member comprises a steel material.

In some configurations, each of the first and second fasteners comprise a steel fastener.

In another aspect of the disclosure, the disclosure is directed to wall structure that includes an inner wall, an outer wall and a plurality of bracket assemblies. Additionally, a non-combustible board, a clamping member and insulation are provided. The inner wall has an outer surface. The outer cladding has an inner surface. At least one of the bracket assemblies comprises an elongated bracket member and end wall support members. The elongated bracket member has a cross-sectional configuration defining a body wall having an inner end and an outer end, with a first end wall extending from the inner end of the body wall and a second end wall extending from the outer end. A first end wall support member is attached to the first end wall and a second end wall support member is attached the second end wall. The bracket member further comprises a plurality of fibers within a resin matrix. The non-combustible board has an outer surface and an inner surface. The clamping member is positioned over the second end wall. The insulation overlies the outer surface of the inner wall at least one of above the body wall and below the body wall. The bracket assembly is positioned so that an outer surface of the first end wall overlies the outer surface of the inner wall, and the clamping member overlies the inner surface of the non-combustible board, with the outer surface of the non-combustible board overlying the outer cladding, so as to sandwich the non-combustible board between the clamping member and the outer cladding.

In some configurations, the non-combustible board comprises one of a mineral wool board, ceramic insulation board, or a fire rated material such as Densglas® or gypsum board.

In some configurations, a plurality of fasteners is present to couple the structure, each of the fasteners comprises a metal screw.

In some configurations, the insulation comprises a mineral wool.

In some configurations, the inner wall comprises a gypsum board.

In some configurations, the non-combustible board comprises one of a strip that has a width that is greater than a width of the second end wall so as to extend over a footprint of the second end wall and a strip that spans between a plurality of the plurality of bracket assemblies.

In another aspect of the disclosure, the disclosure is directed to a wall structure. The wall structure has an inner wall, an outer cladding, a plurality of bracket members and a non-combustible board. The inner wall has an outer surface. The outer cladding has an inner surface. The plurality of bracket members coupling the outer wall to the inner wall, the bracket member comprising a plurality of fibers in a resin matrix. The non-combustible board is sandwiched between at least one of the plurality of bracket members and the outer cladding.

In some configurations, insulation is positioned between the inner wall and the outer cladding.

In some configurations, a clamping member is positioned between the non-combustible board and at least one of the plurality of bracket members.

BRIEF DESCRIPTION OF THE DRAWINGS

The disclosure will now be described with reference to the drawings wherein.

DETAILED DESCRIPTION OF THE DISCLOSURE

Figure 1:
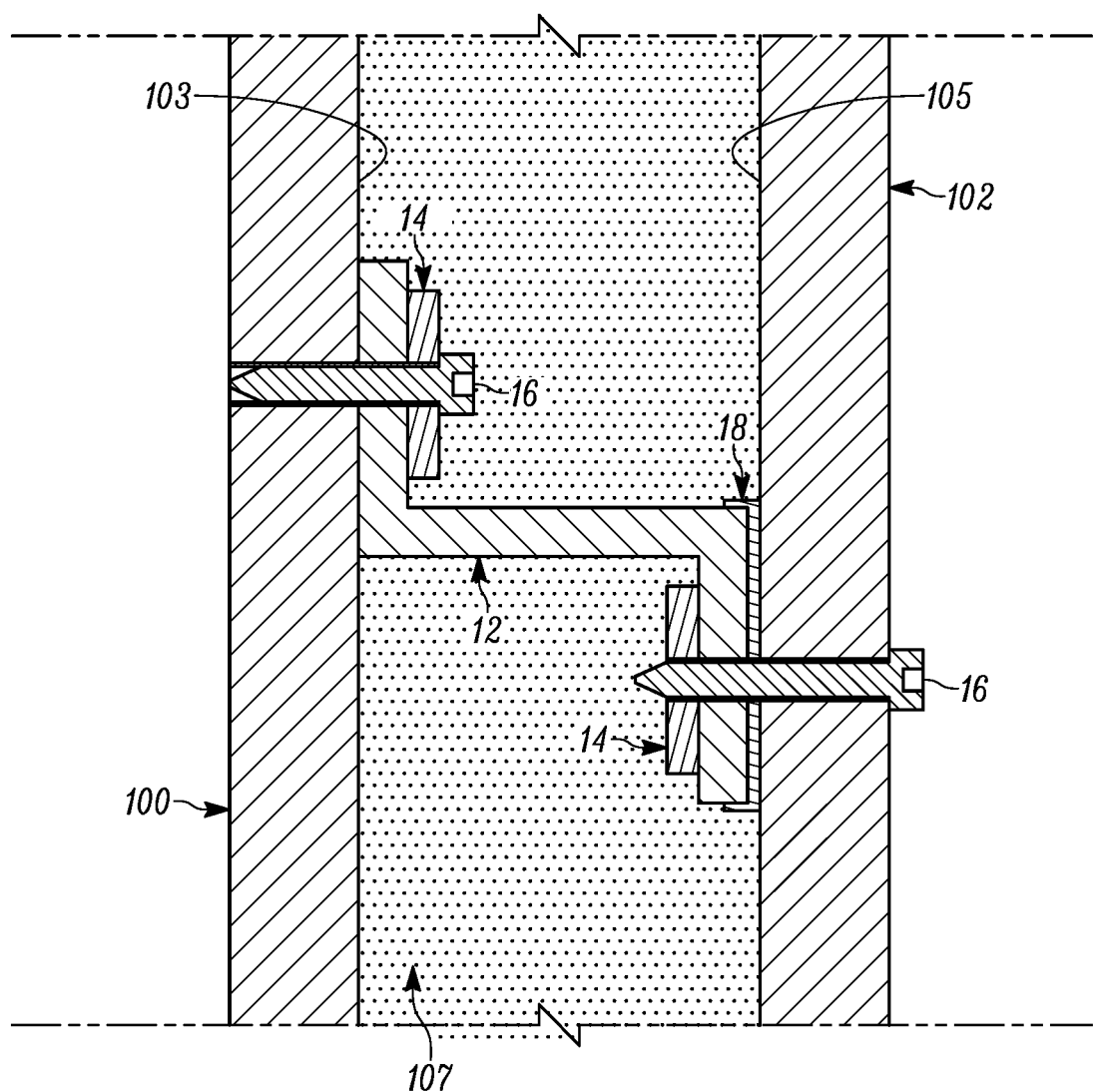
FIG. 1 of the drawings is a cross-sectional schematic configuration of a bracket assembly in a building environment coupled to an inner wall structure and an outer cladding, and having insulation therebetween.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the disclosure is directed to a bracket assembly 10, and more specifically, to the internal composition of a bracket member, such as bracket member 12, as well as structures associated with the bracket member. Amongst other advantages, the bracket member has an internal composition that aids in the structural integrity of a building utilizing the same, and, in particular, in instances of severe fire damage, or catastrophic type fires. Of course, the advantages of such a configuration shown in the present disclosure extends beyond utility in the case of catastrophic type fires and in normal usage, likewise provides advantages.

Figure 1A:
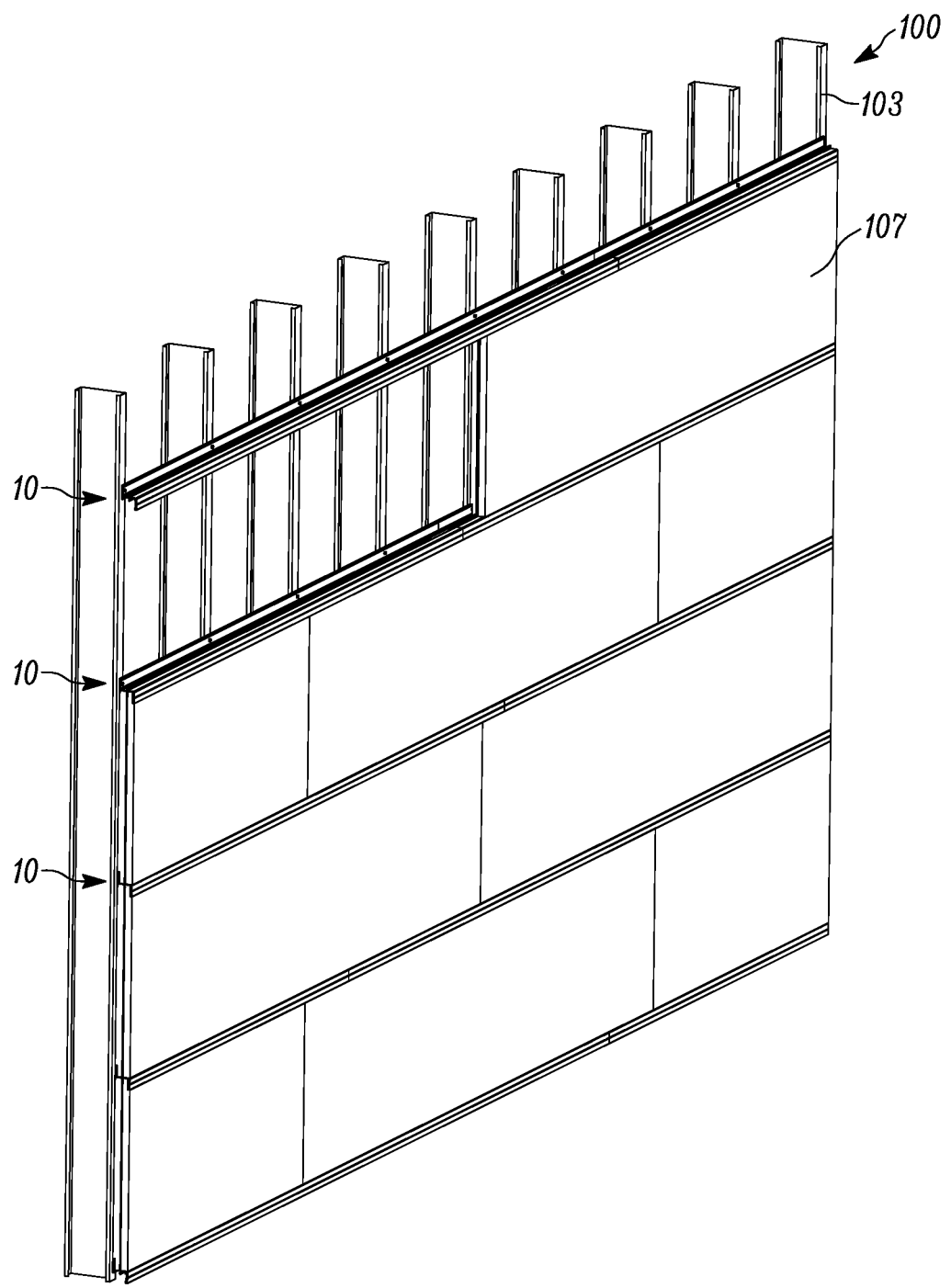
FIG. 1a of the drawings is a perspective view of a wall assembly showing an inner wall structure having a number of bracket assemblies coupled thereto, with insulation therebetween, with the understanding that a cladding would be placed thereover and coupled to the bracket assemblies.

As to the overall structure, and with reference to FIGS. 1 and 1a (showing multiple bracket assemblies coupled to an inner wall structure), it will be understood that typically, the bracket assembly 10 is positioned between, and coupled to each of an inner wall structure, such as inner wall structure 100, and in particular, to the outer surface 103 thereof, as well as to outer cladding 102, and in particular, to the inner surface 105 thereof. Insulation, such as insulation 107 can be placed between the inner walls structure and outer cladding. The two structures can form the outside of a building, and the particular materials from which the inner and outer wall structures are formed, are not to be deemed as being limited. Additionally, in the configuration shown, the bracket member is shown as extending substantially horizontally. It will be understood that the bracket member may likewise extend substantially vertically. Generally, a number of bracket members will span across one of horizontally and vertically (although not required to be in any particular orientation), wherein the bracket members are spaced apart from each other a nominal distance (often times 16" or 24" on center), although other spacings are known to those of skill in the art, and the disclosure is not limited to any particular configuration.

Figure 4:
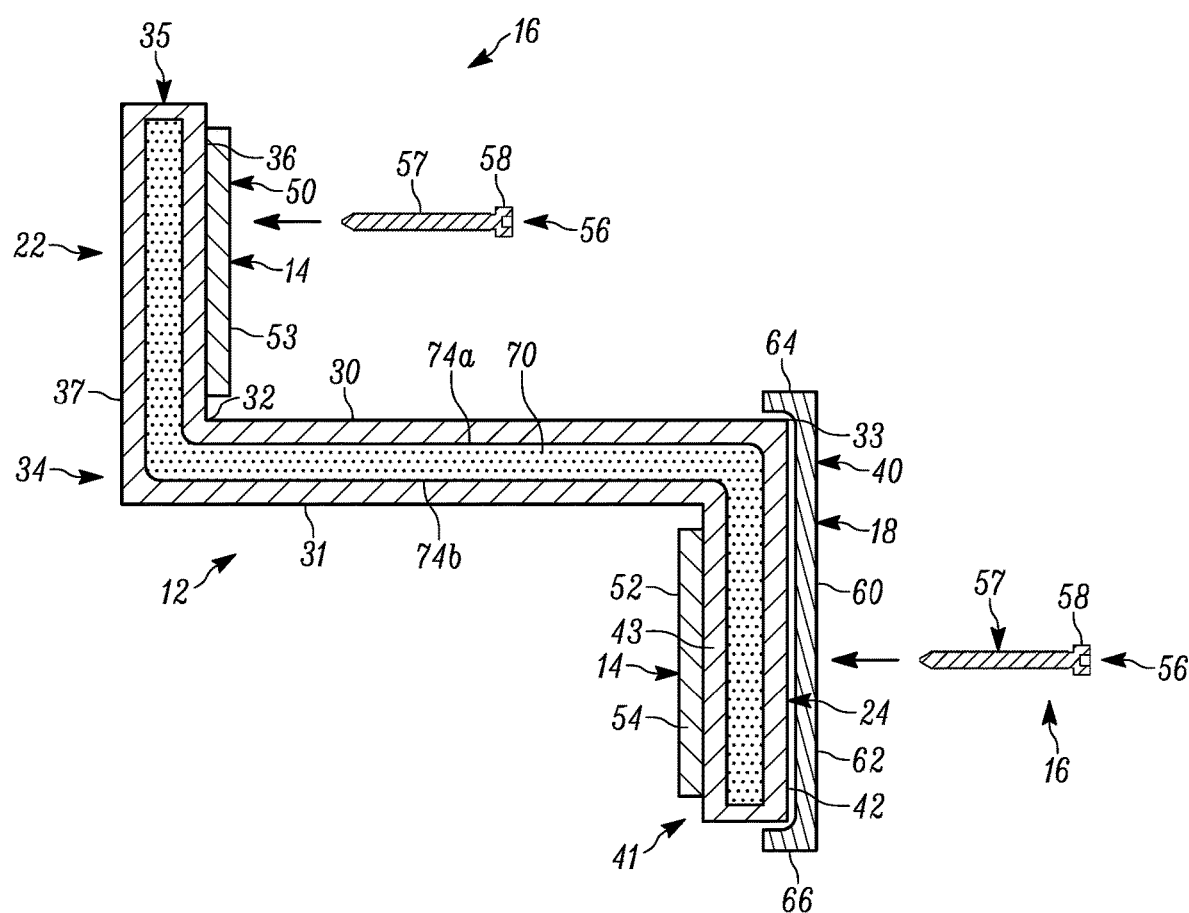
FIG. 4 of the drawings is a cross-sectional schematic representation of a bracket assembly of the present disclosure, showing the configuration of the internal resin matrix, fibers and fiber fabrics.

With reference to FIG. 4, The bracket assembly is shown generally at 10 as including bracket member 12 (which is elongated and may be referred to as an elongated bracket member), end wall support members 14, fastener 16 and clamping member 18. A number of different constructions of the bracket member are contemplated, as well as a number of shapes thereof, having different features. Some of such different constructions are shown in U.S. Pat. No. 9,580,904 issued to Krause. Other constructions are shown in, among other references, U.S. Pat. No. 8,826,620 issued to Krause; and U.S. Pat. No. 8,833,025 issued to Krause. as the disclosure of each one of the foregoing is expressly incorporated by reference in their entirety herewith, as if they are part of the specification hereof. It will be understood that the bracket shown herein is merely exemplary, and the same principles can be applied to the brackets shown in the incorporated references, as well as to other brackets of similar configuration. The brackets shown and incorporated herein are not to be deemed limiting.

Figure 2:
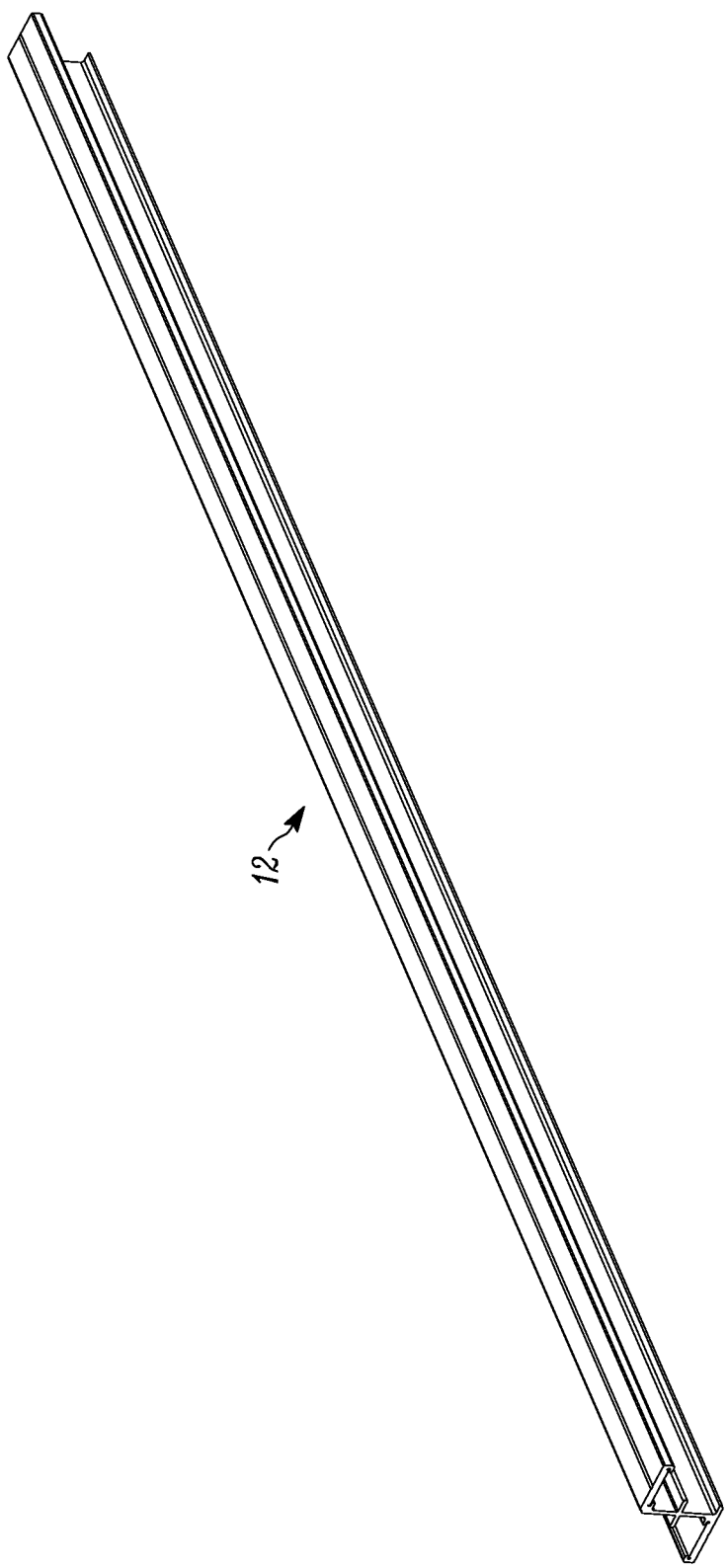
FIG. 2 of the drawings is a perspective view of one configuration of a bracket member of the bracket assembly of the present disclosure.
Figure 3:
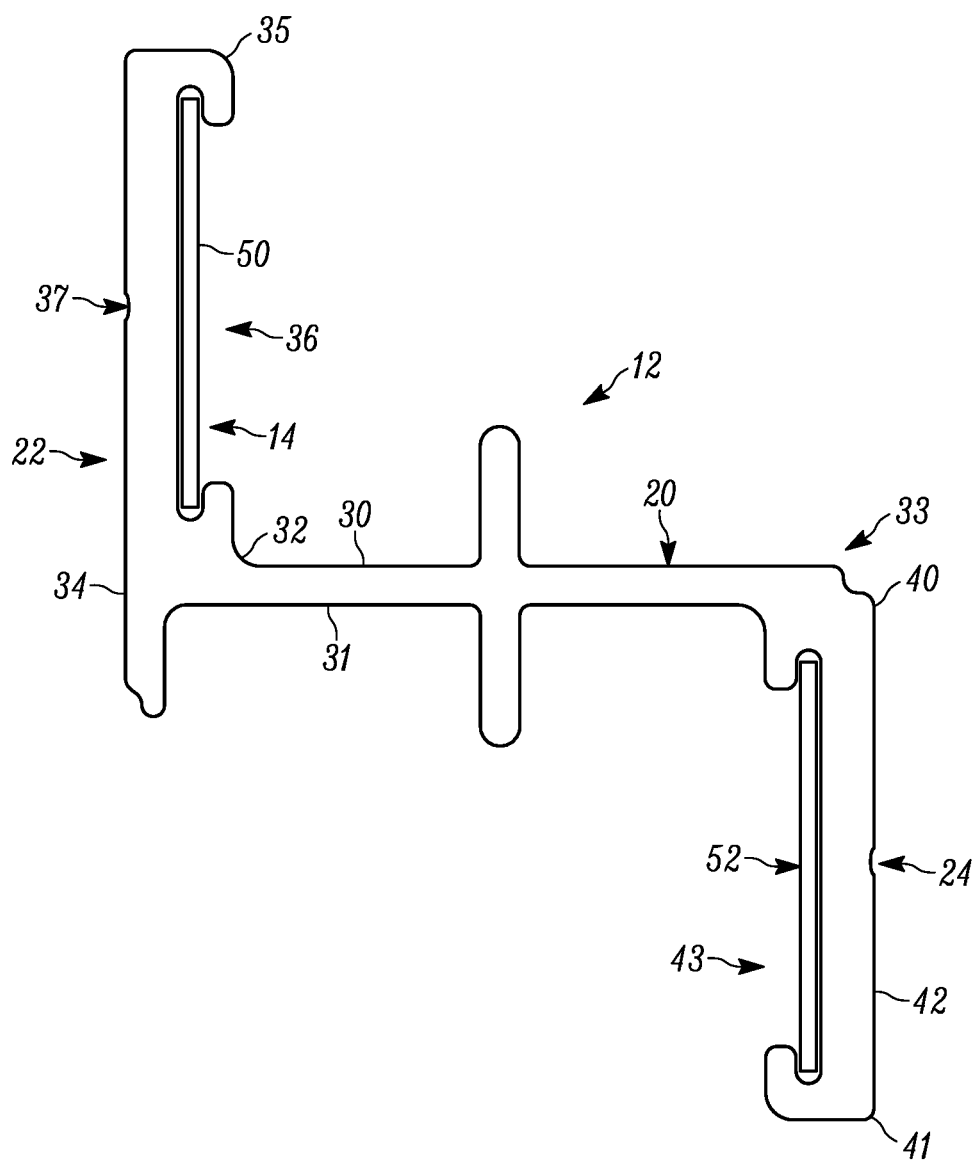
FIG. 3 of the drawings is a cross-sectional view of one configuration of a bracket member and end wall support members of the bracket assembly of the present disclosure.

With reference to FIGS. 2 and 3 (showing one configuration) and in FIG. 4 (shown schematically) 4, a typical bracket member 12 includes body wall 20, first end wall 22 and second end wall 24. In the generic construction shown, the body wall 20 is generally perpendicular to each of the first end wall and the second end wall (both of which are generally parallel to each other). It will be understood that the structures may be other than perpendicular and parallel to each other (i.e., oblique to each other) in some embodiments. Generally, such a configuration is utilized wherein the inner wall structure and outer cladding are generally parallel to each other. The structure is not limited to the parallel and perpendicular relationship between the component wall portions.

In the configuration shown, the body wall 20 includes top surface 30, bottom surface 31, inner end 32 and outer end 33. The top surface 30 is opposite the bottom surface 31 and the inner end 32 is positioned proximate the first end wall with the outer end 33 positioned proximate the second end wall at an opposite end thereof. The bracket member 12 generally comprises a substantially uniform pultrusion that has a generally uniform cross-sectional shape, or configuration. Variations may be introduced along the length thereof through post extrusion operations, or other pultrusion manufacturing techniques. It will be understood that the principles of the present disclosure are not limited to uniform pultruded bracket members having such uniform pultruded cross-sectional shapes and configurations.

Generally, the first end wall 22 extends in a perpendicular manner upwardly from the inner end 32 of the body wall 20. The first end wall includes proximal end 34 and distal end 35 as well as outer surface 36 and inner surface 37. It will be understood that the proximal end 34 meets the inner end 32 of the body wall 20, extending upwardly therefrom. It will further be understood that in other configurations, a portion of the first end wall may be directed in a downward direction, that is extending away from the bottom surface 31 of the body wall. In such a configuration, the first end wall may be bisected, or intersected by the body wall, and the downward portion that extends from the bottom surface 31 may comprise a lower distal end. In some configurations, the portion of the first end wall that extends in a downward direction may be shorter or longer than the portion that extends in an upward direction. It will be understood that upward and downward are directions that refer to the cross-sectional drawing shown in the Figure, and generally correspond to the structure when the structure is mounted in a horizontal manner onto a building. It will be understood that in other configurations, a different mounting structure is contemplated. The principles may be utilized of the present disclosure regardless of vertical and/or horizontal (or oblique) mounting of the bracket member relative to a building.

The second end wall 24 extends in a perpendicular manner downwardly from the outer end 33 of the body wall 20. The second end wall includes proximal end 40, distal end 41 as well as outer surface 42 and inner surface 43. It will be understood that the proximal end 40 meets the outer end 33 of the body wall, with the distal end extending in a downward direction away from the bottom surface 31 of the body wall 20. It will be understood that a portion of the second end wall 24 may extend above the body wall and may extend away from the top surface of the body wall.

A number of other structures may be formed into the body wall, the first end wall and/or the second end wall. For example, ribs may be positioned on either one or both of the top and bottom surfaces of the body wall. Additionally, other structures may be positioned on any one of the different surfaces, or interfaces with the surfaces, including channels, ribs, nubs, protrusions and the like. Further still, the end walls may include different structures which extend above or below the top wall.

The end wall support members 14 are shown in FIGS. 3 and 4 as comprising first end wall strip 50 and second end wall strip 52. The first end wall strip 50 is positioned to overlie the outer surface 36 of the first end wall with the outer surface 53 facing outwardly configured to receive a fastener. It will be understood that the first end wall strip may include a plurality of openings, or the like to facilitate the receipt of fasteners. In some configurations, such as in the configuration of FIG. 3 the outer surface of the first end wall may include a channel, with the first end wall strip 50 being substantially planar, and slidably positioned within that channel. In the configuration of FIG. 4, while shown schematically, the end wall strips may be adhered or otherwise mounted to substantially flat surfaces of the end walls.

A number of other configurations are likewise contemplated. For example, some of such exemplary configurations are shown in FIGS. 5a through 5e. Again, these along with the above structures are merely exemplary, and are not to be deemed limiting. For example, and with reference to FIG. 5a, the first end wall strip may comprise a member having an upper and a lower channel, each of which interfaces with corresponding slots on the first end wall so as to be slidably mated together wherein the end wall strips overlie the mating structures of the end walls. In other configurations, such as the configuration shown in FIG. 5b, a single slot or channel may be presented, and glue or adhesive may be utilized in place of or in addition to the mechanical slidable coupling. Alternatively, the configuration may rely on an interference fit between the channel and the body wall.

Figure 5A:
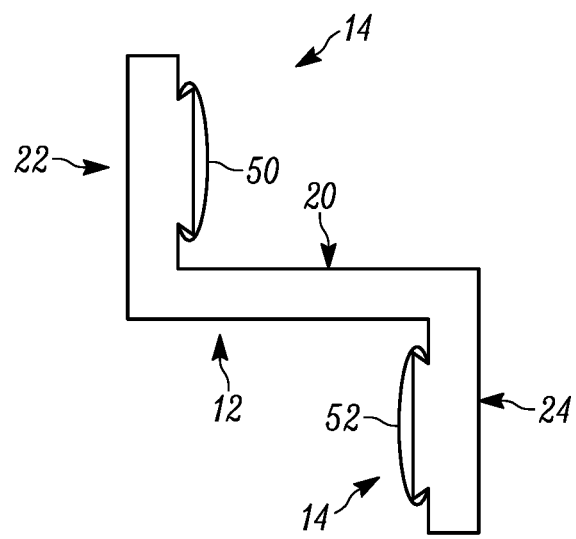
FIGS. 5a through 5f of the drawings are other illustrative bracket members, showing other configurations of the end wall support members and the coupling therebetween.
Figure 5B:
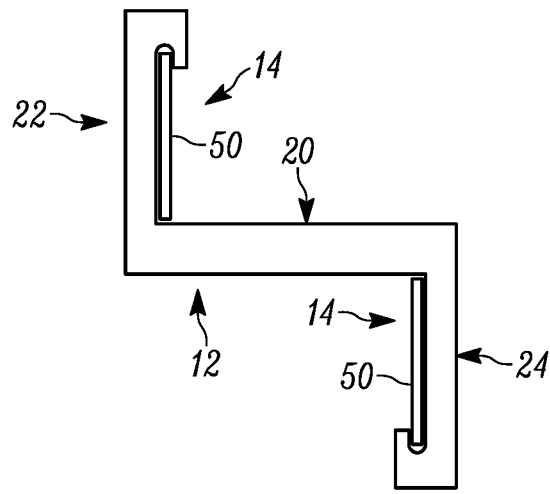
Figure 5C:
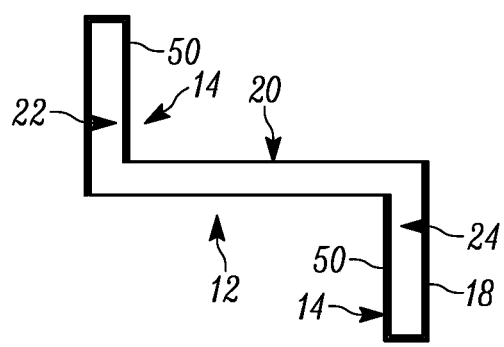
Figure 5D:
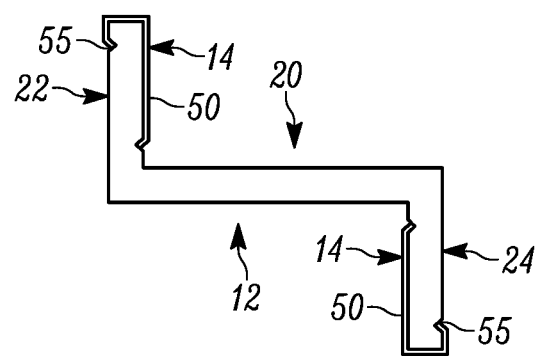
Figure 5E:
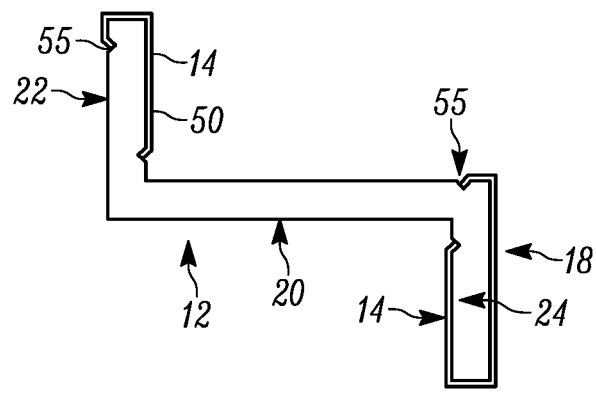
Figure 5F:
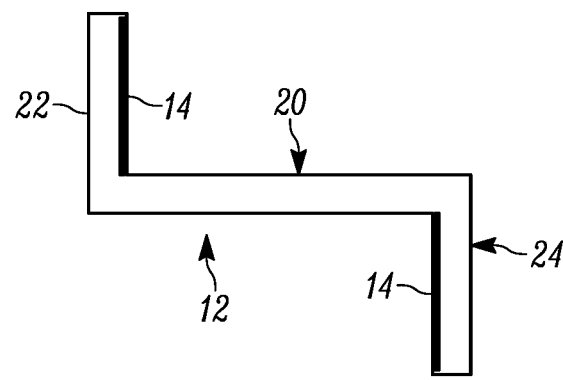
Figure 6A:
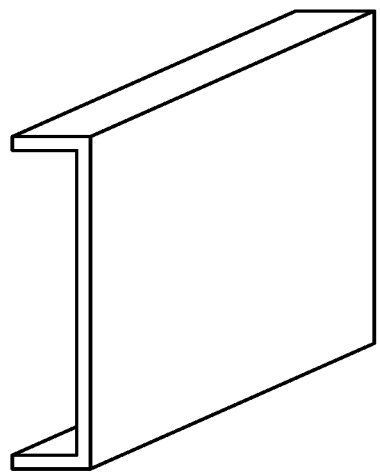
FIGS. 6a through 6f of the drawings comprise illustrative bracket members, showing other configurations of the clamping member utilized with the present disclosure.
Figure 6B:
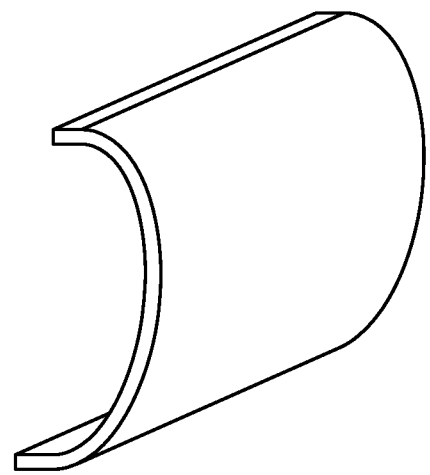
Figure 6C:
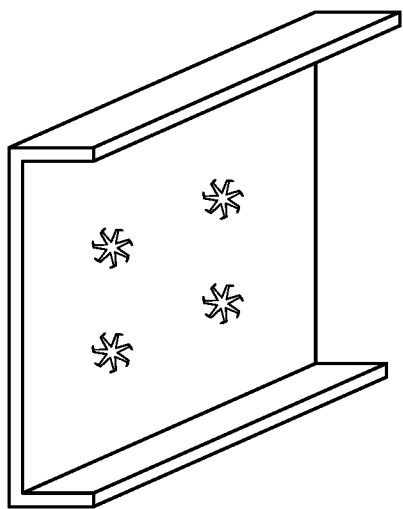
Figure 6D:
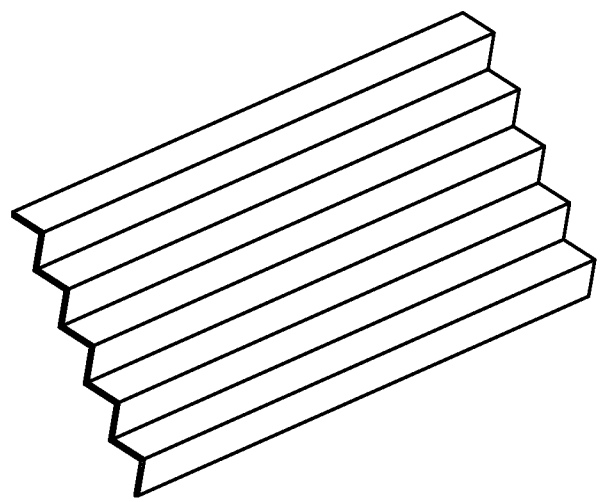
Figure 6E:
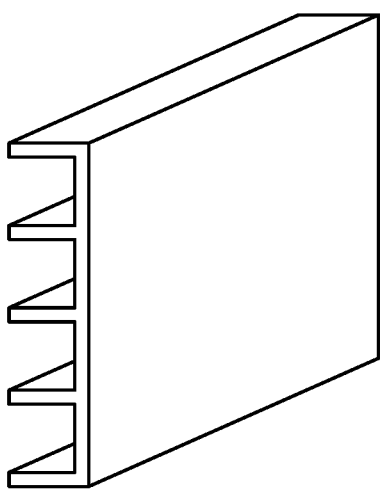
Figure 6F:
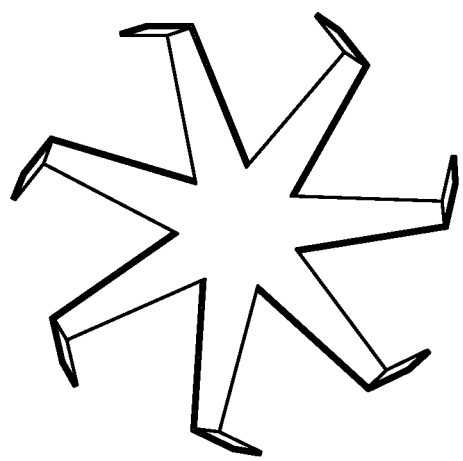

In still other configurations, such as the configuration of FIG. 5f, the end wall strips may be integrally molded (i.e., pultruded) or otherwise formed with the respective end wall. It may be pultruded as the outermost surface, or, as shown in the Figure, the end wall strip may be wholly or substantially wholly encapsulated by the resin matrix and the fibers.

In another configuration, such as the configuration of FIG. 5c, the end wall strips may extend over multiple surfaces of the end walls, that is, both the inner and outer surfaces thereof. In some configurations, the end wall strips may extend over portions of the top or bottom surface of the body wall. In the configuration of FIG. 5d, the second end wall strip 52 may extend over substantial portions of the outer and inner surfaces of the second end wall. In another configuration, such as the configuration of FIG. 5e, the end wall support members may extend over the corresponding wall of the bracket member, and may interface with structures on the bracket member so as to bite into, or lock into, such structures. For example, barbs 55 can be configured to exert a force on the first and second end walls, respectively. The end wall strips, in such configurations, can be formed so as to exert a biasing force onto the barbs 55. In some configurations, the first and second end walls may include channels or the like which are configured to receive the barbs 55. It will be understood that the barbs 55 may extend along the length of the end wall strips, in some configurations, whereas in other configurations, the barbs may comprise discrete points of contact or points of contact that extend along a portion of the length thereof. In the configuration of FIGS. 5c through 5e, the first end wall strip and the bracket member can be combined into a single structure.

Figure 7A:
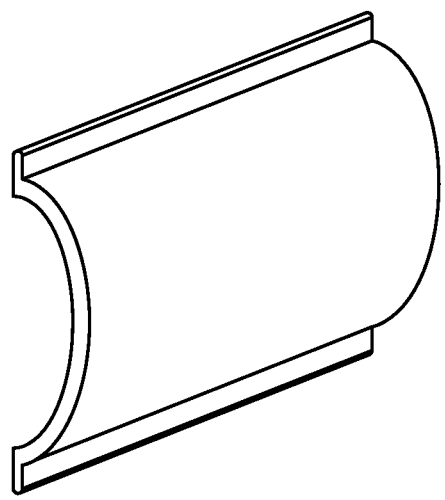
FIGS. 7a through 7c of the drawings comprise illustrative configurations of end wall support members that, when coupled to a bracket member provide a biasing force due to a convex and/or concave configuration.
Figure 7B:
Figure 7C:
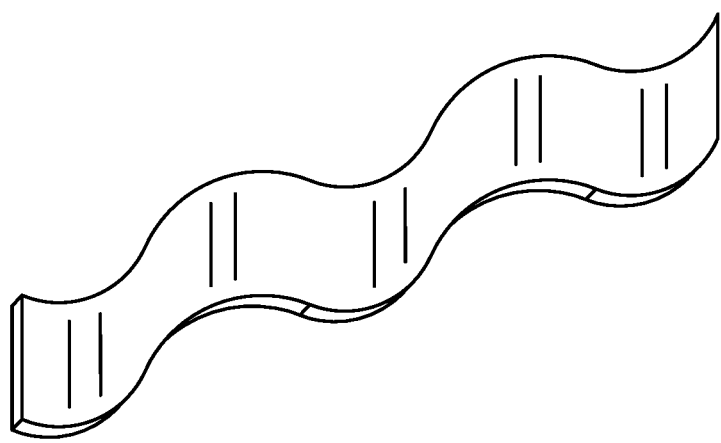

Additionally, the configuration may be such, as is shown in FIGS. 7a through 7c, that the first end walls strip 50 may be outwardly convex (FIG. 7a) or wavy (alternatingly convex and concave) (FIGS. 7b and 7c) and that it may be pressed into a planar configuration by the spring. In such a configuration, the first end wall strip exerts an outward biasing force against the fastener centrally, with inward forces directed at the first end wall at the extremities. As such, when installed, the end wall strip exerts a biasing force against the respective end wall so as to be biased thereagainst. In the event of a catastrophic event, as the resin deteriorates, the biasing force of the end wall strips can maintain a strong hold on the remaining fibers.

Preferably the first end wall strip comprises a metal member, such as a steel member, or a stainless steel member. Other materials are contemplated including titanium members and alloys that have sufficiently high strength at elevated temperatures. It is contemplated that non-metal members may be utilized as long as such members have a sufficiently high transition temperature, melting point and integrity. The foregoing materials are exemplary and not to be deemed limiting.

The second end walls strip is substantially similar in construction as the first end wall strip. That is, not that they are required to be identical, but that they can both be selected from a number of different configurations, some of which are described above. The second strip is positioned on the inner surface 43 of the second end wall 24 with the outer surface 54 facing away therefrom. As with the first end wall strip, the second end wall strip is configured to receive a fastener therethrough, however, in the configuration shown, after the fastener has passed through the corresponding second end wall. It will be understood that as with the first end wall strip, the end wall strip may be coupled to either one of the outer surface and the inner surface, and the configuration shown is merely exemplary. In other words, the manner in which the first and the second end wall strips are coupled or mated with the respective one of the end walls does not have to be the same on a particular bracket assembly. That is, the first end wall strip can be mated to the first end wall in a manner that is different than the manner in which the second end wall strip is mated to the second end wall.

In the configurations shown, the end wall support members are spaced apart from either one of the proximal and distal ends of the respective first and second end walls. As such, it is contemplated that the fastener will be located in a configuration that extends generally centrally within the first end wall or the second end wall strip, or in an offset configuration, however, generally spaced apart from either of the distal end or the proximal end.

The fastener 16 is shown in FIG. 4 as comprising a screw having head 56 and shank 57. The head includes bearing surface 58. Typically, the screw may be one of a number of different types of screws and fasteners. Typically, the screw is utilized to couple the outer cladding to the second end wall and the first end wall to the inside wall structure of the building. Preferably, the fastener 16 comprises a steel or stainless steel structure, while other structures are likewise contemplated.

The clamping member 18 is shown in FIG. 4 as comprising a number of different optional configurations. One such configuration is an outer retaining clip, such as outer retaining clip 60. The retaining clip 60 includes front panel 62, top panel 64 and bottom panel 66. The front panel 62 overlies the outer surface 42 of the second end wall 24. The top panel 64 overlies a portion of the top surface of the body wall. Finally, the bottom panel overlies the distal end 41 of the second end wall. In some configurations, the structure is typically a few inches wide so that a fastener can be directed therethrough. Such a structure is preferably formed from a metal member such as steel or stainless steel or other metal or alloy thereof that has adequate high temperature properties. It will be understood that the outer retaining clip 60 in cooperation with the second end wall strip 52 sandwiches the second end wall 24 therebetween. In structures where the end wall and the retaining clip are combined, the retaining clip may extend the entire length of the bracket member, or may be formed into a plurality of spaced apart retaining clip portions that are each coupled to the respective end wall (which may or may not be continuous along the length of the bracket member).

In other configurations, the clamping member may comprise another structure which is configured to sandwich the second end wall between the second end wall strip and the clamping member. Structures may be presented on the contact surface of the clamping member (such as inward protrusions or the like), that can bite or compress portions of the second end wall. As will be explained, such structures allow for the clamping and retention of the remaining portions of the second end wall in the event of a catastrophic fire. Some such configurations are shown in FIG. 6a through 6e. In some configurations, the use of a clamping member can be omitted, and reliance can be made on the existing structures of the building assembly and the bracket assembly.

The bracket member is formed, preferably, through a pultrusion process utilizing a plurality of independent fibers, bundles (or rovings) as well as fabrics that may be stitched or that may be woven. With reference to FIG. 4, a schematic of a typical construction of the present disclosure is shown, wherein the bracket member is formed from a plurality of fibers or rovings, such as rovings 70, as well as at least one fabric, such as fabric 74a, 74b, all of which is captured within a resin matrix, such as resin matrix 72. As will be understood the rovings 70 and the fabric 74a, 74b are wetted out, or otherwise placed in a resin bath prior to pultrusion through a die. The resin matrix 72 represents the cured resin that was pultruded through the die. It will be understood that some configurations may be formed entirely from fabrics and no rovings may be utilized. It will be understood that one or more resin systems may be utilized, and that different configurations may have different requirements.

In the configuration shown, the fabric 74a, 74b is one of a woven fiber fabric and a stitched fiber fabric. A woven fiber fabric comprises fibers (or rovings) that are woven so that fibers extend in two directions, at right angles relative to each other (i.e., in a crisscross configuration). A stitched fiber fabric comprises a plurality of fibers or rovings that are positioned in the same direction in a generally side by side and overlying orientation (all generally in the same direction). They are then stitched together through stitching that may be formed from any number of different materials. The stitching generally extends perpendicular to the direction of the fibers and occurs at a spaced apart interval along the resulting fabric.

Among other fibers, glass fibers, such as e-glass, s-glass and others, carbon fibers, cellulose fibers, nylon fibers, aramid fibers, Kevlar fibers, as well as other reinforcing type fibers may be utilized for both the rovings and the fiber fabrics. These are merely exemplary and the structure is not limited thereto.

In the configurations shown schematically in FIG. 4, the construction includes at least one fiber fabric that extends from the first end wall, through the body wall, to the second end wall. In each instance the fabric extends at least as far as the first end wall strip 50 at the first end and at least the second end wall strip 52 at the second end. More preferably, the at least one fiber fabric extends beyond the position of the openings for the fastener (or the projected position of the fastener) on both of the first end wall and the second end wall. That is, the at least one fiber fabric may extend to the distal end of each of the first and second end walls.

In other configurations, a second fiber fabric may be positioned that extends along the same path wherein the two are spaced apart from each other. For example, the first fiber fabric may be positioned at or near the outer surface of each of the first end wall and the second end wall, and the top surface of the body wall. The second fiber fabric may be positioned at or near the inner surface of each of the first and second end walls and the bottom surface of the body wall. In each instance, the two structures may be spaced apart from each other and in a generally parallel configuration (although variations are contemplated), so as to be positioned in a side by side fashion or configuration. Preferably, the first and second fiber fabrics comprise a single continuous fabric, although it is contemplated that one of the two may comprise multiple separate fabrics that are positioned in an overlapping configuration (preferably along the body wall).

As such, it will be understood that individual fibers or rovings generally fill the position between the first and second fiber fabrics, as well as preferably form the structures such as channels, nubs, ribs, and the like. It is preferred that the first and second fiber fabrics remain generally free of slack so that they generally proceed directly from start to end without undue undulations or other structural features. It is further contemplated that the position of the fiber fabric and the configuration of the fiber fabric may be altered along the length of the elongated bracket member.

In the instance of stitched fiber fabrics, it will be understood that the fibers are generally oriented so as to be perpendicular to the direction of travel through the pultrusion and perpendicular to the elongated nature of the bracket member (although oblique configurations are contemplated for some applications). It is preferred, however, that the fibers are oriented to be perpendicular to the direction of pultrusion and/or slightly oblique thereto. With reference to FIG. 10, it is further contemplated that a single fabric may be directed from the first end wall through the body wall to the second end wall and back to the first end wall, as opposed to using two separate fabric layers. It is further contemplated that where stitched fiber fabrics (and even woven fiber fabrics), at either end of the fabric, a hem may be stitched or otherwise formed so as to form two layers within the first end wall and second end wall proximate the first and second end wall strips. With further reference to FIG. 11, it will further be understood that it is contemplated that fiber fabrics in excess of two fiber fabrics are contemplated for use, as are fabrics that comprise multiple plies. It is contemplated that the fabrics may be distinct where multiple fabrics are utilized, such that some of the fabrics comprise stitched fabrics, with the others comprising woven fabrics.

Figure 8A:
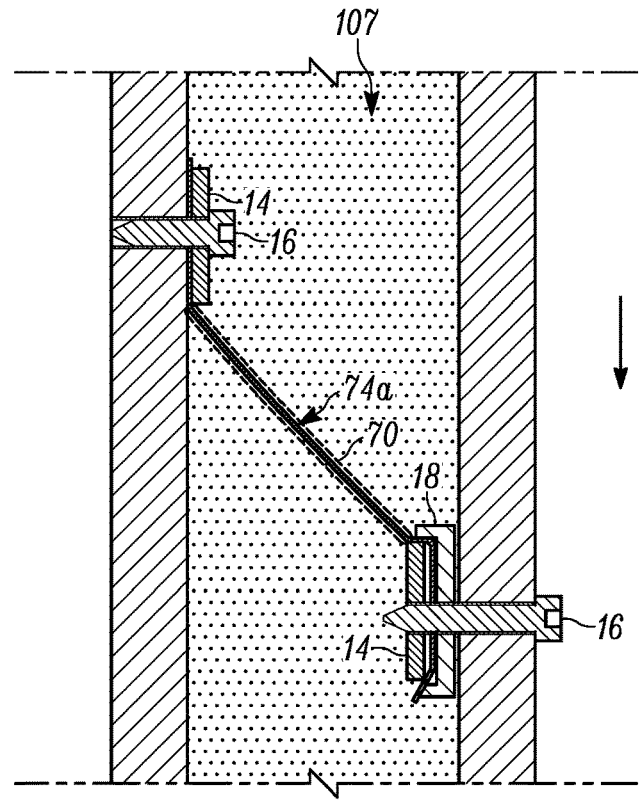
FIGS. 8a and 8b of the drawings are different configurations of the end wall support members so as to provide a clamping or biasing force when positioned within the channels of the first and/or second end walls.
Figure 8B:
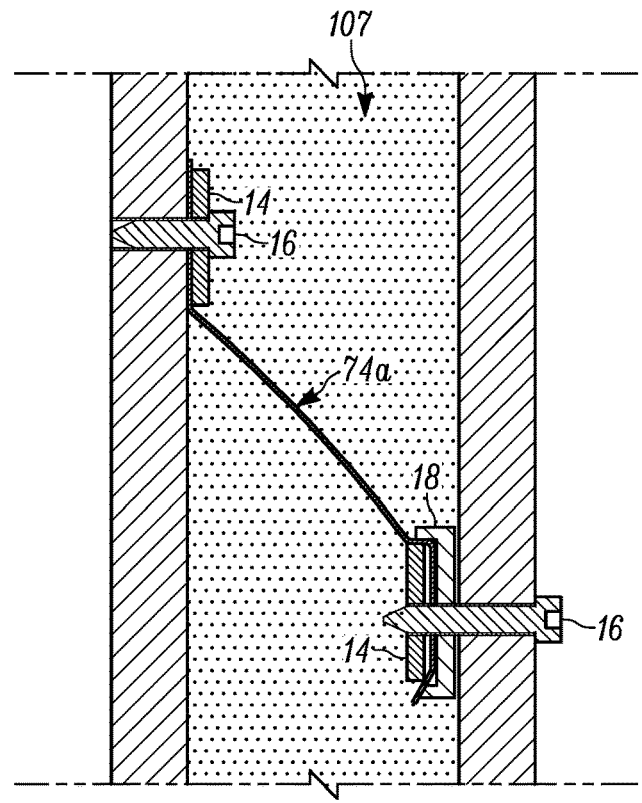

The structure will be explained in operation, and in an environment that is in the midst of a catastrophic fire. It will be understood that in a catastrophic fire, as the temperature rises, the structure of the resin will become weaker and eventually burn. With reference to FIG. 1, we first show a configuration that is a steady state configuration prior to a fire. With reference to FIGS. 8a and 8b, during a catastrophic fire, the resin structure is compromised and begins to burn through (as does the insulation positioned between bracket members). At such time, the weight of the cladding upon the compromised bracket members begins to alter the shape of the bracket members, and the cladding moves downwardly.

While many of the fibers and rovings are positioned in the direction of the bracket member, and generally parallel to both the inner wall structure and the outer cladding of the building, the fiber fabric material includes fibers and/or rovings that are perpendicular to the direction of the bracket member and that span between the inner wall structure and the outer cladding. Even in a catastrophic fire, these fibers can withstand extreme temperatures (generally in excess of the resin within which the fibers are embedded), while maintaining strength that exceeds that of steel at the same temperature. Thus, as the cladding sags, the fiber fabric material becomes taught between the building and the cladding, thereby maintaining the cladding coupled to the building.

It will be understood that the fabric is retained at either end by the interface between the fibers, the end wall support members and their respective fastener. In some configurations, it is also contemplated that a clamping member may be utilized which also cooperates with the end wall support members and the respective fastener to retain the fibers in the desired coupling with the outer cladding and inner wall structure, in turn, sandwiching the same. In addition, in the case of a woven fiber fabric, the rovings and fibers that extend along the length of the bracket member interface with those that are perpendicular to also aid in the retention of the fibers in such a catastrophic fire. The ends of such a woven fiber fabric, and/or a stitched fiber fabric may be hemmed or otherwise finished to likewise insure that the proper retention is achieved between the end wall support members and the fasteners (and, where utilized, the clamping members). It will further be understood that a similar situation occurs in a configuration wherein the bracket members are oriented vertically instead of horizontally. Again, the fabric fibers are retained by the end wall support members, and the fasteners (and, the clamping member), so as to maintain the cladding coupled to the inner wall by way of what remains of the bracket assembly. In this way, even in the event of a catastrophic failure (such as a fire), mechanical coupling is maintained between the inner wall and the outer cladding through the fabric.

Figure 9:
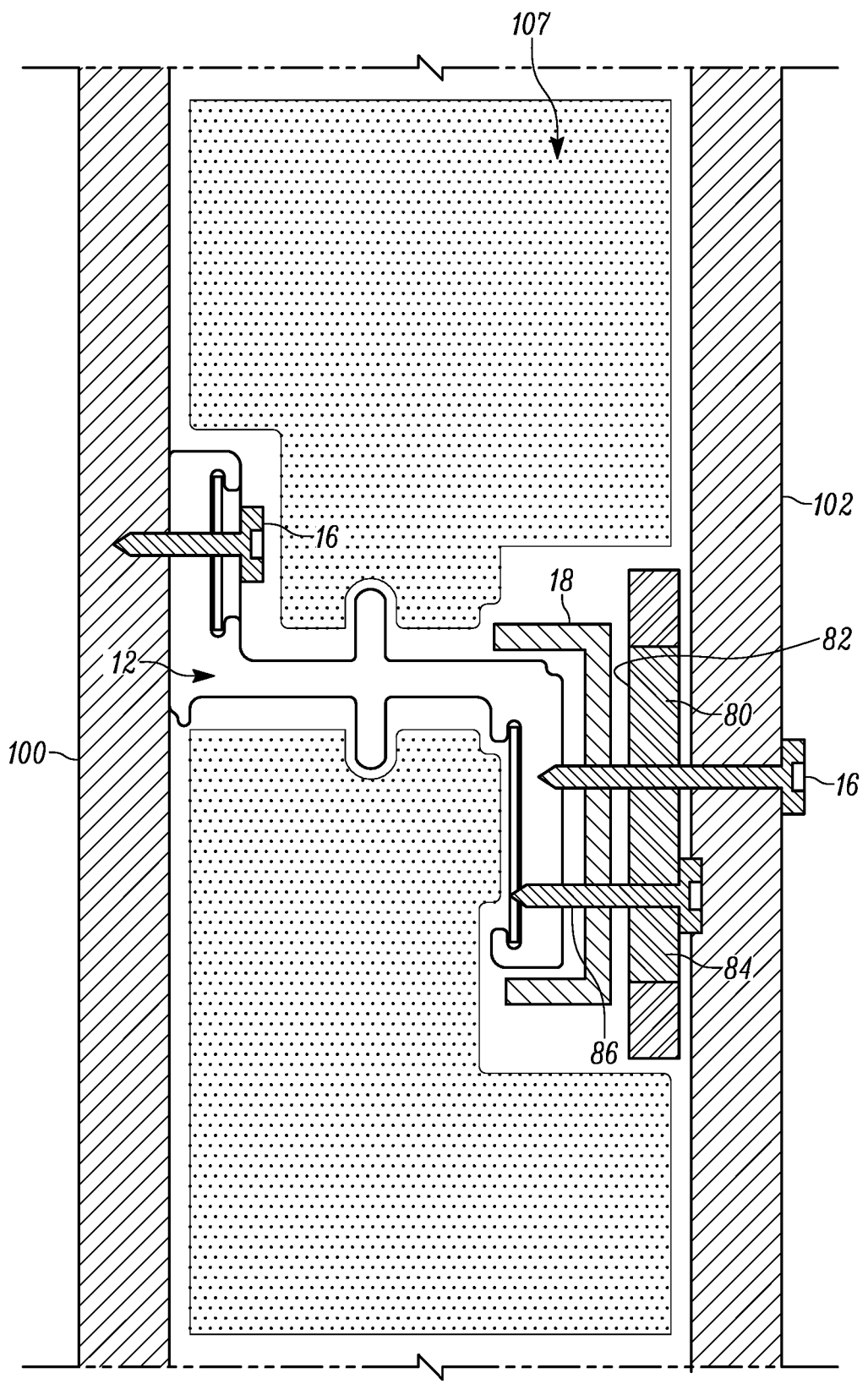
FIG. 9 of the drawings is a cross-sectional schematic representation of a bracket assembly of the present disclosure, in an assembled wall configuration, showing the configuration thereof.

In another embodiment of the device, shown in FIG. 9, a non-combustible board 80 (sometimes referred to as a shield), is coupled between bracket assembly 10, clamping member 18, and outer cladding 102. In this configuration, the bracket assembly 10 remains coupled to inner wall structure 100 through fastener 16 and insulation 107 surrounding bracket assembly 10. Further, the clamping member 18 remains coupled between the bracket assembly 10 fastener 16 securing the two together. The non-combustible board 80, is coupled to the clamping member 18 and outer classing 102 with fastener 86 securing the shield between the two aforementioned parts.

The non-combustible board 80 comprises inner surface 82, outer surface 84 which are attached to the existing structure with fastener 86. The inner surface 82 and outer surface 84 are substantially opposite with respect to one another. The fastener 86 extends between the inner surface 82 and outer surface 84. Further, the fastener may be a coupling mechanism including, but not limited to, bolts, screws, nails, or other fastening rod-like devices, or may comprise a stainless steel fastener having a substantially high strength and heat resistance. The inner surface 82 is proximal to the clamping member 18 and the outer surface 84 is proximal to the outer cladding 102.

It is to be understood the non-combustible board 80 is a strip of material as shown in the exemplary figure. The shield is manufactured in such a way to substantially cover the clamping member with respect to the outer cladding, so that the footprint of the non-combustible board is greater than that of the second end wall of the bracket member. The height may be changed to a different configuration; for example, the shield may overlie the entire structure, or may extend over relative large portions of the insulation as well.

The insulation, in the configuration shown, is made of a mineral wool insulation material, the wall structure is manufactured of gypsum or Densglas® sheathing, and the clamp member and its respective fastener are manufactured from steel (in some configurations, a stainless steel). The shield is made of a non-combustible board or strip which may include a mineral wool board, ceramic insulation board, or a fire rated material such as Densglas® or gypsum board.

For example, the clamping member and its respective fastener may be made of a steel material that comprises higher melting points or a stiffer structure. It is to be understood the steel materials used for manufacturing of the fasteners are to have substantial flame retardant properties such that the coupling between the fasteners, wall, and bracket assembly are not endangered and the purpose of the shield is not circumvented.

The shown embodiment of the device is designed to limit the spread of fires in a building. The shield shown and described limits the spread of the fire or other combustible source to the bracket system by substantially covering the clamping structure and, by extension, the bracket assembly. Due to the non-combustible nature of the shield, the bracket system is substantially protected from the elements necessary to endanger the structure and device, including the relatively higher heat associated with a burning cladding. This provides a means for the wall system to remain integral, and to stop the spread of a fire into the structure or along the cladding back into the structure.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A bracket member for use in the construction of a wall structure, the bracket member comprising:
    an elongated body defining a length between a first end and a second end, and, having a cross-sectional configuration defining:
        a body wall having an inner end and an outer end;
        a first end wall extending from the inner end of the body wall;
        a second end wall extending from the outer end of the body wall, and opposite of the first end wall;
    wherein the first end wall and the second end wall are substantially parallel to each other with the body wall being one of substantially perpendicular and oblique to each of the first end wall and the second end wall;
    wherein the bracket member comprises a pultrusion of a plurality of fibers within a resin matrix, the plurality of fibers includes a plurality of fibers extending from the first end to the second end of the elongated body along the length thereof, and, a fiber fabric including a plurality of fabric fibers, wherein, at least some of fabric fibers extend through each of the body wall, the first end wall and the second end wall and are one of oblique and perpendicular to the fibers extending from the first end to the second end of the elongated body.

2. The bracket member of claim 1 wherein the at least some fabric fibers that extend through each of the body wall, the first end wall and the second end wall are perpendicular to the fibers extending from the first end to the second end of the elongated body.

3. The bracket member of claim 1 wherein the fiber fabric comprises one of woven fiber fabric and a stitched fiber fabric.

4. The bracket member of claim 1 wherein the fiber fabric comprises at least two fiber fabrics extending between the first and second ends of the elongated body, each of which includes fibers that extend through each of the body wall, the first end wall and the second end wall.

5. The bracket member of claim 1 further comprising:
    a first end wall strip overlying an outer surface of the first end wall, the first end wall strip comprising a metal member;
    a second end wall strip overlying an inner surface of the second end wall, the second end wall strip comprising a metal member.

6. The bracket member of claim 5 further comprising a clamping member overlying an outer surface of the second end wall opposite the second end wall strip.

7. The bracket member of claim 6 wherein the clamping member further includes a front panel, a top panel and a bottom panel, the top panel extends over a portion of the body wall, and the bottom panel overlies a distal end of the second end wall.

8. The bracket member of claim 6 wherein the clamping member and the second end wall strip are integrated into a single member that spans over a distal end of the second wall.

9. The bracket member of claim 5 wherein the first end wall strip is mechanically slidably coupled to the outer surface of the first end wall.

10. The bracket member of claim 5 wherein the second end wall strip is mechanically slidably coupled to the inner surface of the second end wall.

11. The bracket member of claim 1 wherein the cross-sectional configuration of the elongated body is substantially uniform between the first end and the second end.

12. A wall structure comprising:
an inner wall having an outer surface;
an outer cladding having an inner surface;
a plurality of bracket members of claim 1;
wherein each of the plurality of bracket members is positioned so that an outer surface of the first end wall overlies the outer surface of the inner wall and is coupled thereto, and an outer surface of the second end wall overlies the inner surface of the outer cladding and is coupled thereto, so as to sandwich each of the bracket members between the inner wall and the outer cladding.

13. The wall structure of claim 12, wherein plurality of first fasteners extend through the first end wall of the bracket member and the inner wall, and wherein a plurality of second fasteners extend through the second end wall of the bracket member and the outer cladding.

* * * * *